United States Patent Office 3,306,680
Patented Feb. 28, 1967

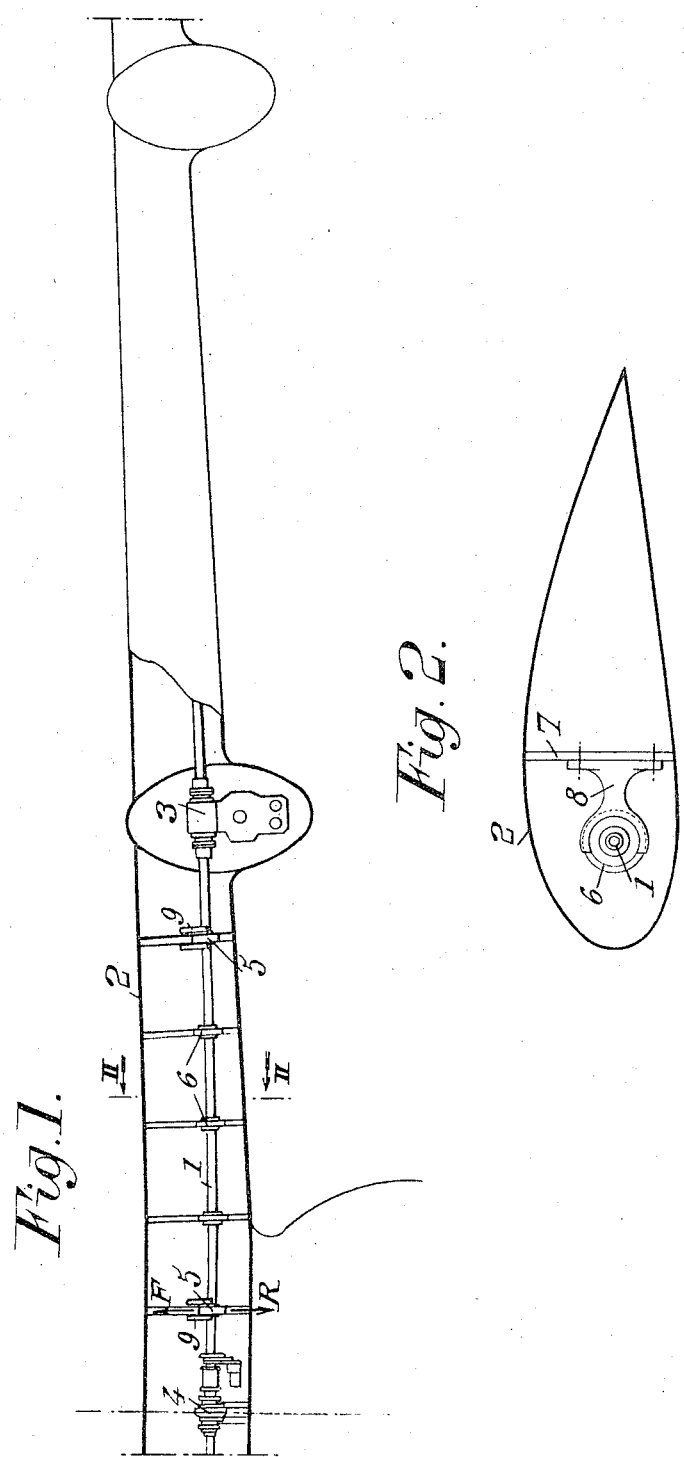

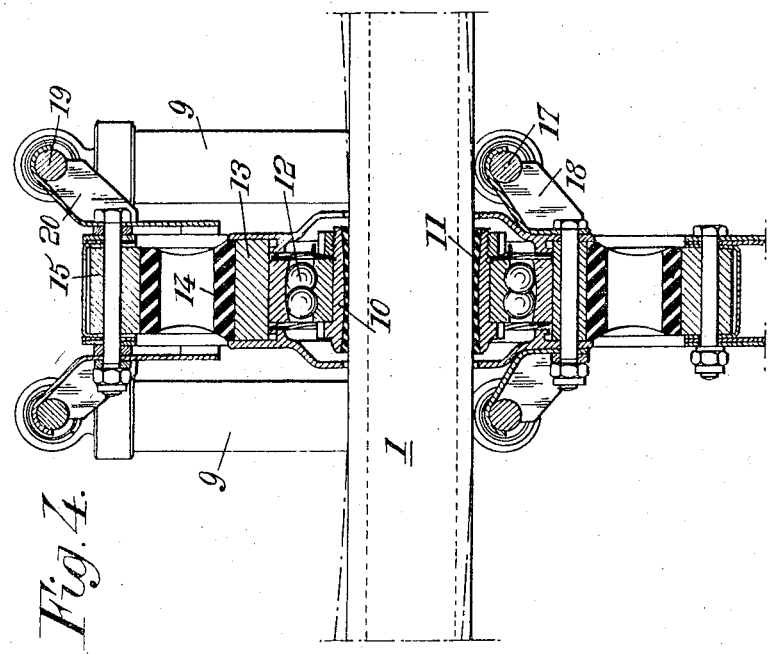
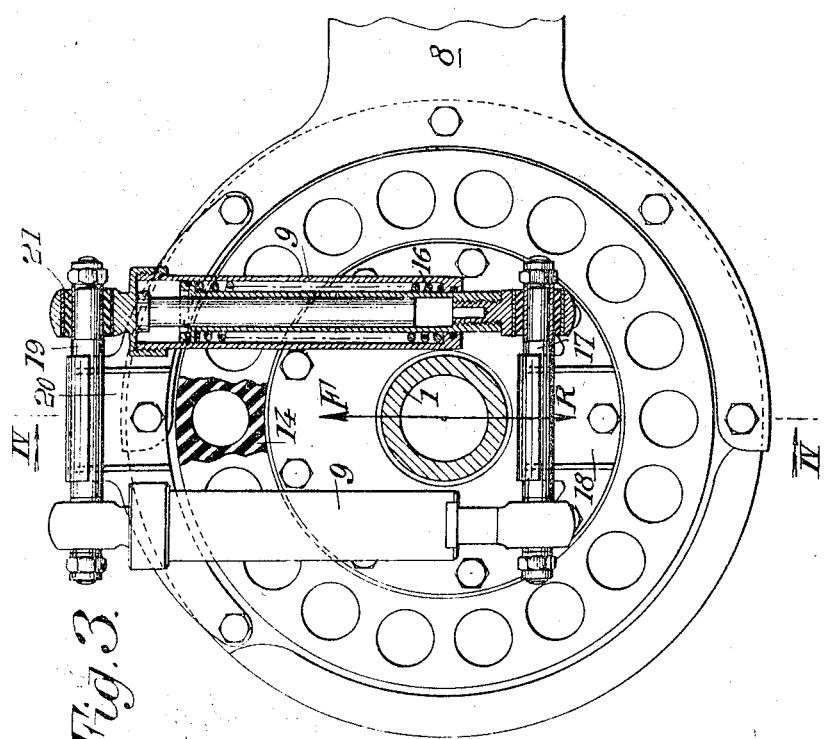

3,306,680
BEARINGS FOR A BENT FLEXIBLE
TRANSMISSION SHAFT
Marcel Martin Francois Bruyere, Bois-Colombes, France, assignor to Societe d'Exploitation des Materiels Hispano-Suiza, Bois-Colombes (Seine), France, a society of France
Filed Oct. 30, 1963, Ser. No. 320,114
Claims priority, application France, Nov. 2, 1962, 914,263
3 Claims. (Cl. 308—27)

The present invention relates to systems comprising a supporting structure, at least two bearings carried by said structure and the respective axes of which make an angle with each other and a bent flexible shaft journalled in said bearings.

The chief object of the present invention is to provide a bearing for such a system which is better adapted to meet the requirements of practice than those known at the present time.

Such a bearing comprises an inner bearing portion having said shaft journalled therein, an outer bearing portion carried by said supporting structure, a resilient sleeve interposed between said two bearing portions and disposed around said shaft symmetrically about the axis thereof so as to oppose radial displacements of said inner bearing portion relatively to said outer bearing portion with a force proportional to said radial displacements, and resilient means distinct from said resilient sleeve carried by said outer bearing portion for exerting on said inner bearing portion a constant force equal and opposed to that exerted on said inner bearing portion by the bent flexible shaft.

Preferred embodiments of the present invention will be hereinafter described with reference of the appended drawings, given merely by way of example, and in which:

FIG. 1 is a diagrammatic front view, with parts cut away, of the wing of a multi-engine aircraft the engines of which are coupled together through a bent flexible transmission shaft journalled in resilient bearings made according to the present invention;

FIG. 2 shows, on an enlarged scale, a cross section on the line II—II of FIG. 1;

FIG. 3 is a view showing, on a higher scale, in elevation with parts cut away, one such bearing; and FIG. 4 is a sectional view on the line IV—IV of FIG. 3.

The following description with reference to the drawings relates to the case of a transmission system including resilient bearings for a transmission shaft 1 intended to interconnect the output shafts of the engines of a multi-engine aircraft. The wing 2 of this aircraft has a substantial dihedral angle so that the transmission shaft must be bent into curvilinear shape.

In the construction illustrated by FIGS. 1 and 2, a flexible shaft 1 is disposed between a transmission gear 3 and a central bearing 4, said shaft being located between the longitudinal plane of symmetry of the aircraft and the first engine located on one side of said plane. This flexible shaft 1 must be bent so as to conform with the dihedral angle of wing 2.

In order to maintain this bent shape, shaft 1 is journalled at the ends thereof in two resilient bearings 5 the respective axes of which make with each other a suitable obtuse angle. On the other hand, preferably, between said end portions, intermediate resilient bearings 6, are provided said end bearings 5 and intermediate bearings 6 being supported by the framework 7 of wing 2 for instance through brackets 8 extending transversely to the shaft.

The reactions R exerted by flexible shaft 1, due to the bent shape thereof on each of its end bearings 5 are compensated by a resilient device 9 interposed between the framework 7 of the wing and the inner portion of the bearing 5 that is considered, the force and the direction of action of said compensating device 9 being such that the force F it produces balances, at least partly, and preferably is substantially equal in intensity and opposed in direction to, the mean value of said reaction.

Intermediate resilient bearings 6 carried by wing 2 are free from any reaction due to the bending of flexible shaft 1.

Advantageously, the bearing is made as shown by FIGS. 3 and 4. In such a construction, the following elements are combined together.

(a) A journal 10 secured to shaft 1 through a sleeve 11, for instance of rubber, this rubber sleeve 11 being fixed to said shaft by glueing. Advantageously, as shown, said journal 10 has a curved profile with an inwardly turned curvature, so as to permit deformation of shaft 1 owing to an increased thickness of the rubber sleeve 11 at the ends thereof:

(b) A ball bearing 12 interposed between journal 10 and a socket 13 which constitutes the inner portion of the flexible bearing, and (c) a resilient sleeve 14, preferably provided with recesses, as shown, interposed between socket 13 and an annular piece 15 forming the fixed portion of the flexible bearing, said fixed external portion 15 being secured to the framework 7 of wing 2 through one of the transverse elements 8 above referred to.

Concerning the compensating device 9 included in each bearing 5, it is advantageously constituted by two pairs of resilient links disposed on either side, respectively, of the bearing. Each of these pairs of links is disposed along the direction of the reaction R and interposed between bearing portions 13 and 15 in such manner as to exert upon bearing portion 13 a compensating force F of a direction opposed to that of reaction R and preferably of a value substantially equal to the mean value of R in normal flying conditions.

Every resilient link 9 consists, in the example shown, of two telescopic elements subjected to the action of a spring 16 tending to retract said elements into each other.

In the example shown, the ends of the inner telescopic elements 9 of a given pair are connected together by a cross member 17 fixed to the inner bearing portion 13 by a fixation plate 18.

The ends of the outer elements of said pair are connected together by a cross member 19 secured to the outer bearing portion 15 through a fixation plate 20.

It should be noted that whatever be the construction of the compensating means, said means must be capable, once mounted in position, of permitting radial displacements in all directions and within given limits of the inner bearing portion 13 on which they are mounted.

For instance, in the embodiment described with reference to the drawings, this radial freedom of inner bearing portion 13 may be obtained by providing resilient sleeves 21 between the ends of members 17 and 19 and the telescopic elements to which they are connected.

It should be well understood that the resilient bearings according to the invention might serve to hold a flexible shaft serving to drive from a distance, on an aircraft, an element absorbing an important power, for instance a tail airscrew having a vertical or horizontal axis according to its function.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. In a system comprising a supporting structure, at least two bearings mounted on said structure so that their respective axes make an angle with each other and a curved flexible shaft journalled in said bearings, the combination, to constitute each of said bearings, of a first bearing portion fixed to said structure, a second bearing portion having said shaft journalled therein, resilient means for interconnecting said two bearing portions with each other, and resilient compensating means interposed between said second bearing portion and said structure for exerting on said second bearing portion a force of a direction opposed to the load supported in operation by said second bearing portion due to the bending of said shaft, said compensating means including at least one pair of stretching resilient links disposed on each side respectively of said bearing.

2. In a system comprising a supporting structure, at least two bearings carried by said structure and the respective axes of which make an angle with each other and a bent flexible shaft journalled in said bearings, the combination, to constitute each of said bearings of
 (a) an outer bearing portion carried by said supporting structure,
 (b) an inner bearing portion in said outer portion having said shaft journalled therein,
 (c) a resilient sleeve, interposed between said outer bearing portion and said inner bearing portion, said resilient sleeve being disposed around said shaft symmetrically about the axis thereof so as to oppose radial displacements of said inner bearing portion relatively to said outer bearing portion with a force proportional to said radial displacements, and
 (d) resilient means, also interposed between said outer bearing portion and said inner bearing portion but distinct from said resilient sleeve, for transmitting from said outer bearing portion to said inner bearing portion a force equal and opposed to that exerted on said inner bearing portion by the bent flexible shaft.

3. A combination according to claim 2 wherein said resilient means comprises at least one stretching resilient link disposed on each side, respectively, of said bearing.

References Cited by the Examiner
UNITED STATES PATENTS

| | | | |
|---|---|---|---|
| 550,589 | 12/1895 | Busenbenz | 308—27 |
| 1,664,880 | 4/1928 | Flintermann | 308—26 X |
| 2,858,173 | 10/1958 | Leibach | 308—9 |
| 3,037,573 | 6/1962 | Larson | 180—70 |
| 3,175,636 | 3/1965 | Winkelmann | 180—70 |

MARTIN P. SCHWADRON, *Primary Examiner.*

DAVID J. WILLIAMOWSKY, *Examiner.*

N. ABRAMS, G. N. BAUM, *Assistant Examiners.*